Feb. 7, 1933. A. E. SELVESTER 1,896,427
HITCH
Filed Feb. 17, 1932 2 Sheets-Sheet 1
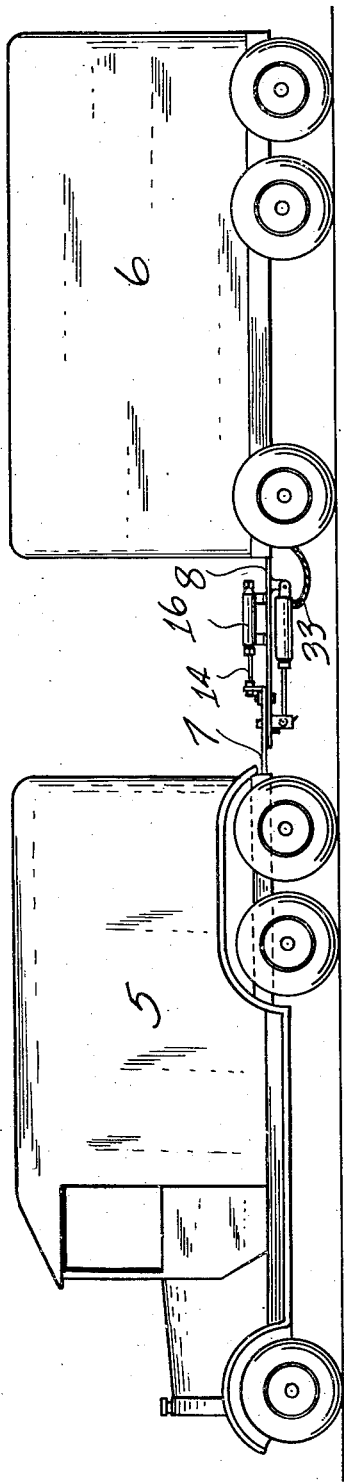
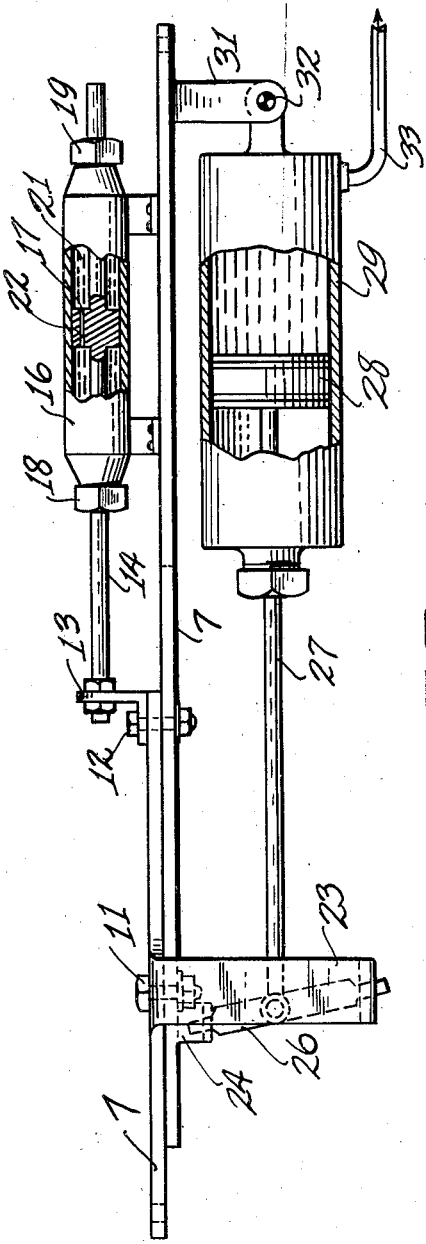
INVENTOR.
ARNOLD E. SELVESTER
BY
ATTORNEYS.

Feb. 7, 1933. A. E. SELVESTER 1,896,427
HITCH
Filed Feb. 17, 1932 2 Sheets-Sheet 2
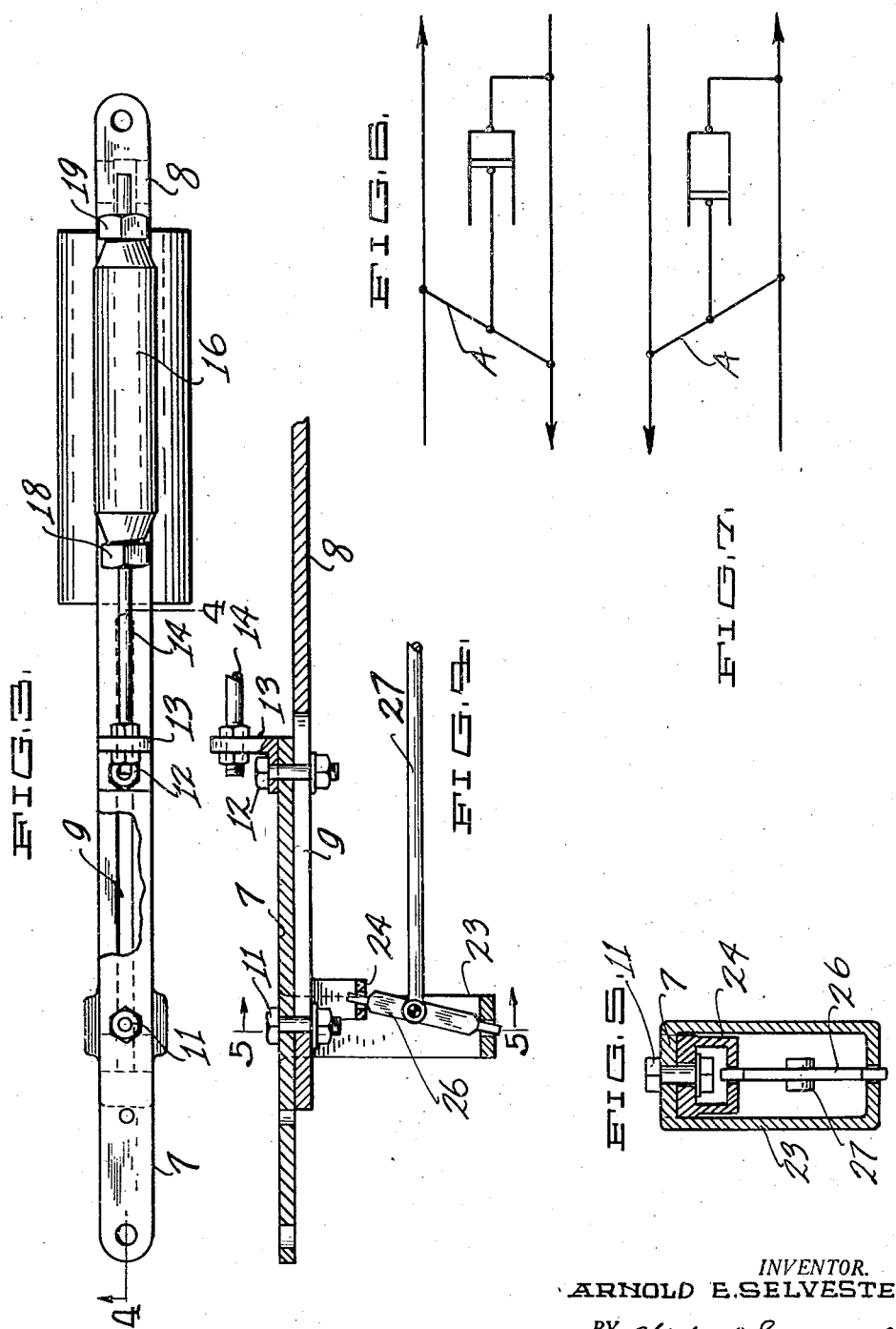
INVENTOR.
ARNOLD E. SELVESTER
BY Victor J. Evans & Co
ATTORNEYS.

Patented Feb. 7, 1933

1,896,427

UNITED STATES PATENT OFFICE

ARNOLD E. SELVESTER, OF KORBEL, CALIFORNIA

HITCH

Application filed February 17, 1932. Serial No. 593,624.

This invention relates to improvements in hitches and has particular reference to a combined hitch and braking mechanism.

The principal object of the invention is to provide means whereby a trailer may be attached to a motor vehicle in such a manner that as the trailer attempts to run onto or overtake the motor vehicle, the brakes will be applied to the trailer in proportion to the degree of over-run.

A further object is to provide means whereby a cushioning effect will take place between the two vehicles.

A further object is to produce a device of the character which may be readily attached to any truck or trailer.

A still further object is to produce a device which is economical to manufacture.

Other objects and advantages will be apparent during the course of the following description.

In the accompanying drawings forming a part of this specification and in which like numerals are employed to designate like parts throughout the same, Fig. 1 is a side elevation of a standard automobile truck and a trailer having my hitch interposed therebetween, Fig. 2 is a side elevation of my hitch showing the parts in the position they would assume when the hitch is in braking position, some of the parts being shown in cross section, Fig. 3 is a top plan view of Fig. 2, Fig. 4 is a fragmentary detail view showing the actuating mechanism in pulling position, Fig. 5 is a cross sectional view taken on the line 5—5 of Fig. 4, Fig. 6 is a diagrammatic view showing the braking operation, and Fig. 7 is a diagrammatic view showing the pulling operation.

It is common to hitch a trailer to a motor vehicle and in some instances to depend entirely upon the operator as to the applying of brakes to the trailer. In some instances the trailer and truck are both connected with air brakes and the brakes on both vehicles operate simultaneously. The result of this condition is that the trailing vehicle often runs up onto the drawing vehicle which may be caused by slowing down or irregularities in the road. This continual approaching and separating of the vehicles causes a severe strain upon the vehicles and also upon the hitch between them. Applicant has therefore devised a very simple mechanism whereby this strain is eliminated and has also incorporated automatic means for applying the brakes of the trailing vehicle when the same approaches the drawing vehicle.

In the accompanying drawings wherein for the purpose of illustration is shown a preferred embodiment of my invention, the numeral 5 designates a motor vehicle which will hereafter be termed a drawing vehicle, and the numeral 6 designates a trailing vehicle. These vehicles are of conventional construction and further comment thereon is unnecessary. Attached to the vehicle 5 is a draw-bar 7 which is slidably held to the tongue 8 of the trailer. This sliding connection is provided through the medium of a slot 9 in the tongue, and bolts 11 and 12 are carried in the draw-bar. The bolt 12 serves to secure a bracket 13 which is in turn secured to a piston rod 14 which enters a cylinder 16 and has a piston 17 positioned thereon. The rod 14 extends through the cylinder and through packing glands 18 and 19 and is entirely surrounded by a fluid 21 which is contained within the cylinder 16. A bleeder opening 22 permits this fluid to flow from one side of the piston to the other.

A yoke 23 depends from the draw-bar 7 and surrounds one end of the tongue 8. This yoke also partially surrounds a depending bracket 24 carried upon the tongue 8. A lever 26 has one end thereof extending through an opening in the bracket 24 and has its opposite end extending through an opening in the yoke 23. This lever 26 is connected to a piston rod 27 which is in turn connected to a piston 28 slidable in a cylinder 29. This cylinder is mounted on the tongue 8, and in the present instance I have shown a lug 31 to which the cylinder is pivoted as at 32. A pipe 33 extends from the cylinder to the brakes of the trailer.

The result of this construction is that when the device is attached to a motor vehicle and a pull is being exerted upon the draw-bar 7, the parts will be in the position shown in Fig. 4 which will cause the pistons 17 and 28 to be in a forward position or in a position to the left of that shown in Fig. 2. When the parts are in this position the bolt 11 will abut the end of the slot 9 and the yoke 23 will be in advance of the bracket 24. Therefore the pivot point of the lever 26 and the rod 27 will be moved forward with relation to the cylinder 29. In consequence there will be no pressure in the cylinder 29 and the brakes of the trailer will be free. As soon as the trailer moves toward the drawing vehicle the draw-bar 7 and tongue 8 will slide upon each other which will cause the yoke 23 to move from the position of Fig. 4 to the position of Fig. 2, or in other words this yoke will move toward the piston 29 and in so doing it will move the lever 26 to the position of Fig. 2 which will in turn move the pivot point of the lever and piston rod 27 toward the cylinder 29 with the consequence that the piston 28 will be moved in the cylinder so as to compress the liquid therein and to force the same through the pipe 33 to the brakes of the trailer.

Referring to Fig. 6 the top arrow represents the stopping force of the driven vehicle and the bottom arrow the forward force of the trailer. As these two forces are connected together by the link A, any movement of the link A rearwardly at the point of connection with the piston rod will force the piston into the cylinder and as this cylinder is connected to the force of the tractor it will be obvious that the piston will compress any medium within the cylinder which compressed medium will be let off for useful purposes.

In Fig. 7 the top arrow represents the pulling force of the driven vehicle and the bottom arrow the dragging force of the trailer. As these forces are tending to move their loads apart, the link A will tend to pull the piston out of the cylinder and consequently no pressure will be delivered to the brakes.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a hitch for motor vehicles, a draw-bar adapted to be attached to a driven vehicle, of a tongue adapted to be attached to a trailing vehicle, a cylinder secured to said tongue, a piston positioned in said cylinder and capable of compressing a fluid in said cylinder, means for conducting said fluid to braking mechanism on the trailer, and a lever connected to said tongue and said draw-bar for actuating said piston.

2. In a hitch for motor vehicles, a draw-bar adapted to be attached to a driven vehicle, of a tongue adapted to be attached to a trailing vehicle, a cylinder secured to said tongue, a piston positioned in said cylinder, a piston rod connected to said piston, a yoke connected to said draw-bar, a bracket connected to said tongue, a lever extending between said bracket and said yoke, said lever being connected to said piston whereby relative movement between said bracket and said yoke will actuate said piston for the purpose of compressing a fluid in said cylinder.

3. In a hitch for motor vehicles, a draw-bar adapted to be attached to a driven vehicle, of a tongue adapted to be attached to a trailing vehicle, a cylinder secured to said tongue, a piston positioned in said cylinder, a piston rod connected to said piston, a yoke connected to said draw-bar, a bracket connected to said tongue, a lever extending between said bracket and said yoke, said lever being connected to said piston whereby relative movement between said bracket and said yoke will actuate said piston for the purpose of compressing a fluid in said cylinder, a second cylinder mounted on said tongue, a piston positioned in said last mentioned cylinder, a piston rod extending through said last mentioned cylinder and connected to said piston, said piston rod being connected to said draw bar, and a bleeder opening through said last mentioned piston whereby fluid in said last mentioned cylinder may pass therethrough.

In testimony whereof I affix my signature.
ARNOLD E. SELVESTER.